Figure 6:
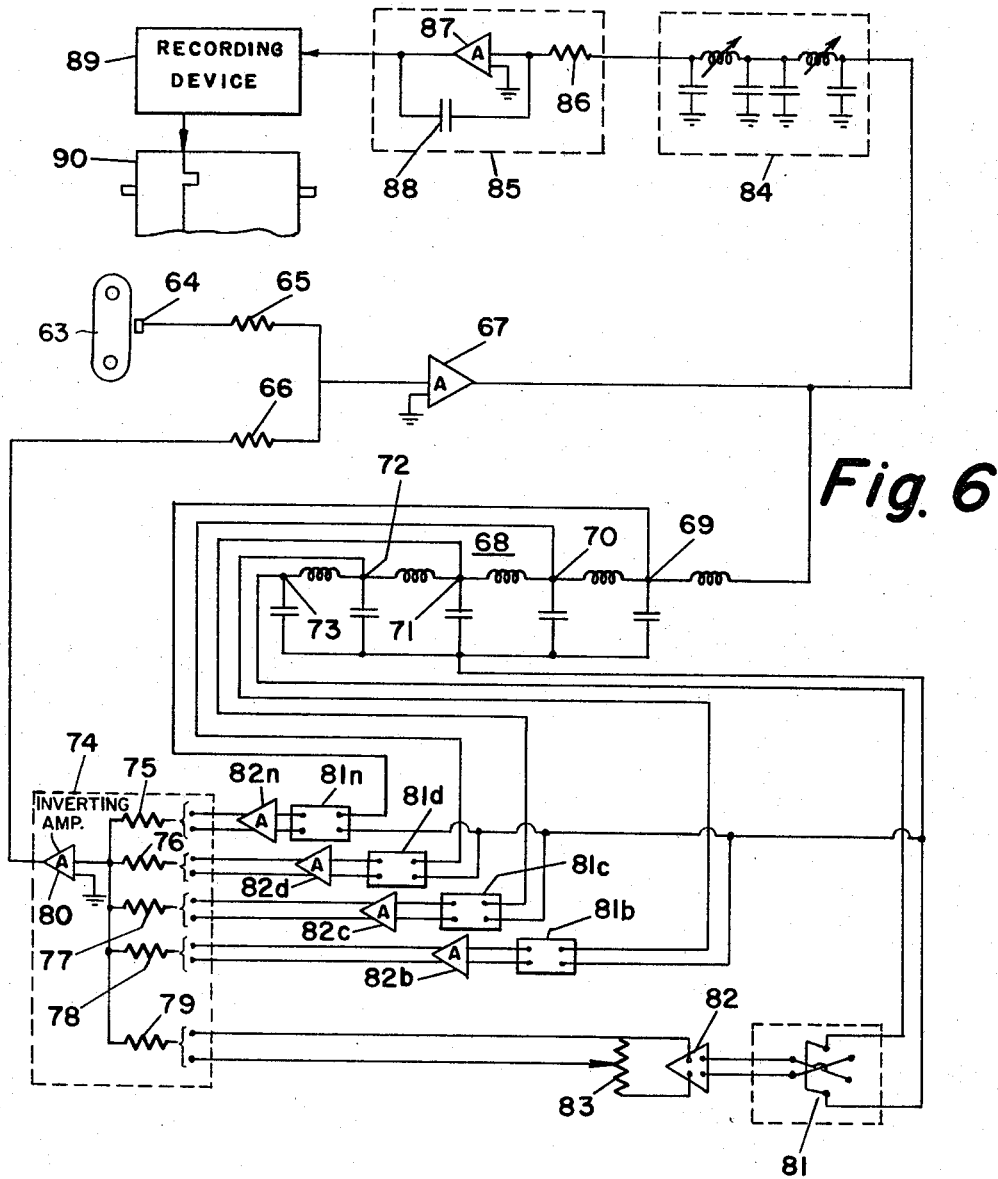

Dec. 27, 1966  P. L. LAWRENCE ET AL  3,295,099
FEEDBACK INVERSE FILTERS
Filed Jan. 9, 1964  2 Sheets-Sheet 1
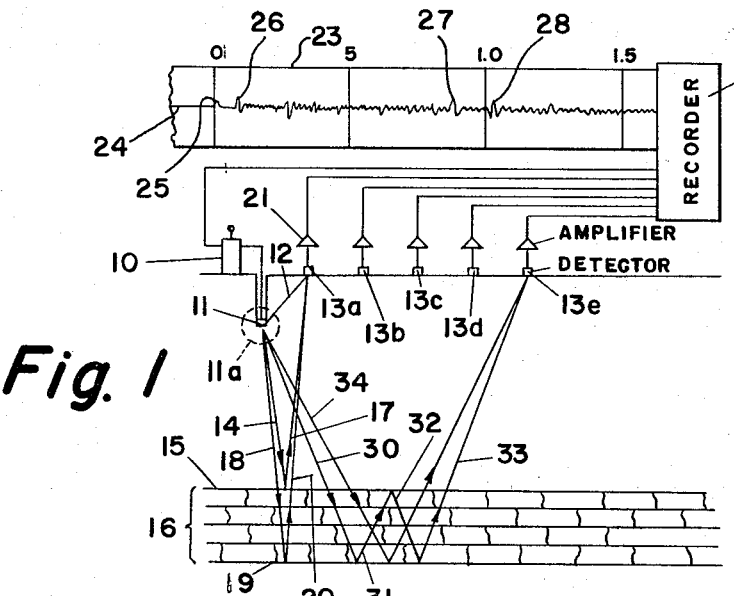
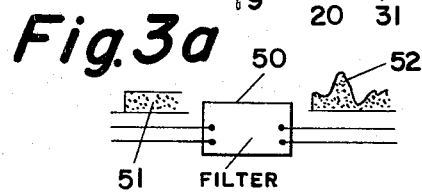
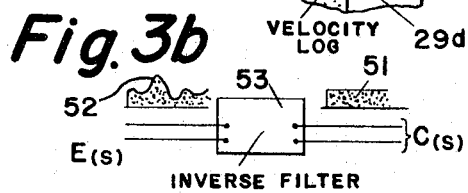
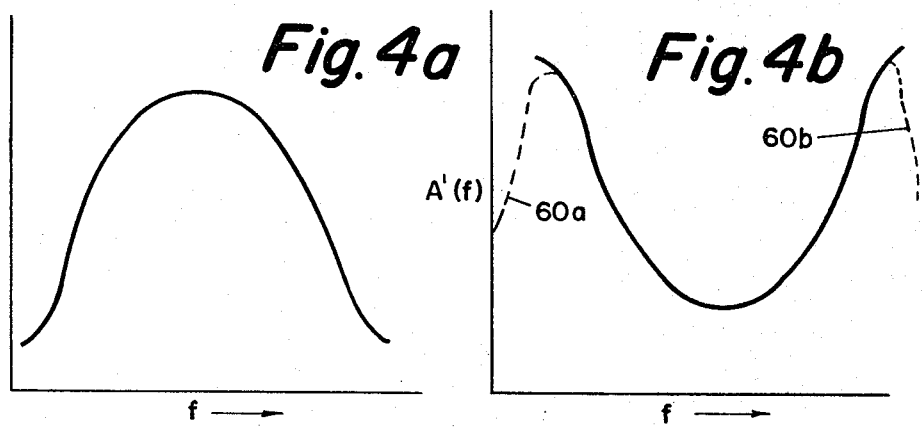
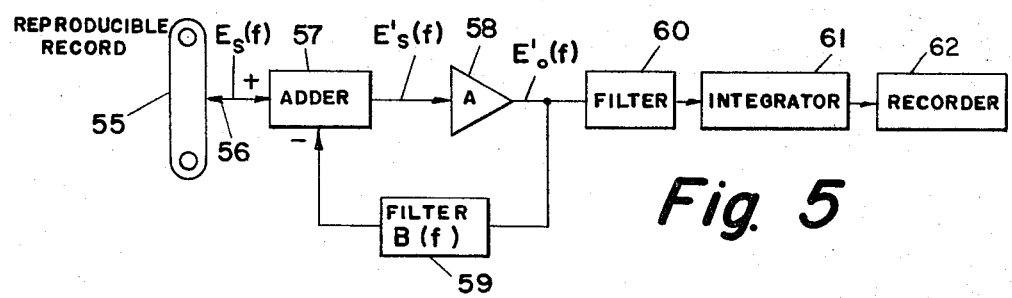

United States Patent Office 3,295,099
Patented Dec. 27, 1966

3,295,099
FEEDBACK INVERSE FILTERS
Philip L. Lawrence, Riverside, Conn., and Robert J. Watson, State College, Pa., assignors to Mobil Oil Corporation, a corporation of New York
Filed Jan. 9, 1964, Ser. No. 336,779
9 Claims. (Cl. 340—15.5)

This invention relates to methods of and means for performing an inverse filtering operation on seismograms to convert them to functions which are directly representative of the velocity layers of the earth.

It has been found that seismograms may more readily be interpreted if they are converted to a form which is analogous to a velocity log of the earth's layering. Velocity logs indicate the velocity of acoustic waves in the earth as a function of depth. Such logs are quite useful in locating oil-bearing sub-surface formations. However, it is difficult and expensive directly to obtain velocity logs because a borehole must be drilled into the earth to obtain the acoustic velocity information from a logging tool which is lowered into the borehole.

It is possible to obtain synthetic velocity logs without the difficulty and expense attendant to drilling a borehole and logging it. Seismograms can be converted to a form similar to a velocity log by filtering the seismogram with a filter having characteristics which are the inverse of the filtering characteristics of the earth and the instruments used in obtaining the seismogram. The inverse filtering technique is described in the present inventors' U.S. Patent No. 3,076,177 of January 29, 1963.

In carrying out the inverse filtering technique, the filtering characteristics of the earth and of the seismic instruments are first obtained. These filtering characteristics may be obtained, for example, from a reflection waveform on a seismogram, which reflection waveform is known to have been caused by a well defined reflecting interface in the earth. In the absence of the filtering action of the earth and the seismic instruments, it can be assumed that this waveform would be a step function. Therefore, the differences between the waveform and a step function are indicative of the filtering action of the earth and the seismic instruments.

Another technique of obtaining the filtering characteristics of the earth and of the seismic instruments is described in U.S. Patent 3,076,176, January 29, 1963, to one of the present inventors. This patent describes the use of the uphole signal on a seismogram to determine the filtering characteristics.

After the filtering characteristics of the earth and seismic instruments are obtained by a suitable method, the difficult problem of obtaining the inverse of the filter characteristics is presented. In the past, the inverse filter characteristics have been obtained by complex analog operations, such as described in both of the two aforementioned patents.

In accordance with the present invention, the problem of obtaining the inverse filter characteristics is obviated by connecting a filter having the characteristics of the earth and the seismic instruments in a negative feedback loop of a high gain amplifier. In such a configuration, the amplifier and associated feedback loop perform inverse filtering on a function fed to the input to the amplifier and representative of the seismogram which is to be inverse filtered.

In carrying out the invention, in one embodiment thereof, the filtering characteristics of the earth and instruments are first obtained. These filtering characteristics are then set into a time domain filter. The time domain filter is connected between the output of a high gain amplifier and a summing circuit which is connected in the input circuit of the amplifier. The output of the time doman filter is applied to the input in an opposite sense to the input function representative of the seismogram, thereby providing negative feedback from the output of the amplifier through the time domain filter to the input of the amplifier. As will subsequently be shown, the frequency response of the amplifier with the negative feedback is proportional to the inverse of the characteristics of the filter which is in the feedback circuit. In this manner, inverse filtering of the input function representative of the seismogram is obtained without performing the more cumbersome task of obtaining the inverse of the characteristics of the earth and instruments.

In accordance with another aspect of this invention, the output of the amplifying system with negative feedback is applied to a second band pass filter which cuts out all low and very high frequency noise. This noise is generated by the negative feedback amplifying system. The results obtained by the inverse filtering operation are very much improved by the inclusion of the second band pass filter in the output circuit.

Figure 7:
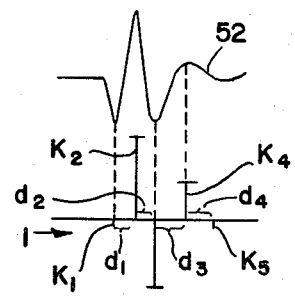

The foregoing and other objects, features and advantages of the present invention will be better understood from the following more detailed description, taken in conjunction with the drawings in which:

FIG. 1 shows a typical geophone layout;
FIG. 2 represents a velocity log;
FIG. 3a represents the filtering characteristics of the earth;
FIG. 3b represents the inverse filtering characteristics of the earth;
FIG. 4a shows the frequency response of the earth;
FIG. 4b shows the inverse frequency response of the earth;
FIG. 5 shows the means for carrying out the invention in block form;
FIG. 6 shows the analog system for carrying out the invention in more detail; and
FIG. 7 represents a reflection from a good reflecting interface of the earth.

Inasmuch as a thorough understanding of conventional seismic exploration is an essential prerequisite to the development of the background theory upon which the present invention is predicated, reference will first be had to FIG. 1 which diagrammatically illustrates a conventional seismograph system. Upon actuation of a blaster 10, a source of acoustic energy such as a small charge 11 of an explosive (for example, dynamite) produces an acoustic pulse. While other forms of seismic wave generators may be utilized, the detonation of an explosive is conventionally employed. Seismic waves thus generated travel from the shot or charge 11 downwardly through the earth's strata and also by way of a more or less direct path 12 to the first detector or geophone 13a. The downwardly traveling wave, as along the path 14, is reflected from the upper surface or interface 15 of a relatively thick, high velocity bed 16. The reflected wave travels along the path 17 to the detector 13a. Seismic energy also travels by way of a path 18 to a reflection point at the bottom surface or interface 19 of the bed 16, this energy returning by way of path 20 to the detector 13a. Electrical signals generated by the detector 13a are applied to an amplifier 21. The amplified output from amplifier 21 is applied to the recorder 22 which produces a seismic record 23.

The seismic record 23 shows a seismic trace 24 which includes a pulse 25 at time 0 corresponding with the instant of detonation of the explosive charge 11.

There immediately follows a high amplitude "uphole" signal 26 (due to the travel of the wave along the path 12) followed by distinctive energy bursts or waveforms at 27 and 28. The seismic trace 24 is to some extent idealized, and the distinctive bursts 27 and 28 are representative of the reflection of the waveforms resulting from the reflection of the seismic energy from the top 15 and bottom 19 of the bed 16. The waveforms 27 and 28 are distinctive in character and stand out in substantial amplitude contrast with respect to the remaining portions of the trace 24. In seismograms obtained in the field, many reflections or waveforms, such as 27 and 28, are likely to be less pronounced and to be somewhat submerged in a background of other reflection energy.

If a log of the acoustic velocity of the section shown in FIG. 1 were to be obtained as by penetrating formations with a borehole and following the procedures described in U.S. Patent 2,704,346, to Summers, such a log in idealized form would be of the character illustrated in FIG. 2. The earth section above the interface 15 is assumed to be of constant velocity as represented by the uniform section 29a. At a point along log 29, corresponding with the depth of the interface 15, there is an abrupt velocity discontinuity or step 29b with a subsequent section 29c of uniformly high velocity followed by a step 29d following which the velocity is lower.

It will be remembered that the length of seismogram 23 is representative of time and that the length of log 29 is scaled in depth. However, upon suitable conversion of one to the other, it will be found that reflections 27 and 28 may be attributed to the velocity contrasts represented by steps or interfaces 29b and 29d In continuous velocity well logging procedures, such as disclosed in the above-identified Summers' patent, the depths of velocity discontinuities may be located with accuracy. The magnitude of the contrasts may be clearly depicted so that not only is there provided an indication of subsurface layering but also there is provided in considerable detail the character of the formations through which the log 29 is secured. In order to obtain such a continuous velocity log, however, it will be readily recognized that the presence of a borehole is indispensable.

In accordance with the present invention, there is provided an indicia of the velocity profile without the necessity of a borehole extending to depth. Since, on a velocity log such as log 29, the interfaces 29b and 29d are of the nature of a step function, it will be seen at once that if the corresponding reflection components recorded on trace 24 are converted into steps, such steps may then be interpreted in terms of velociy layers and the resultant seismogram will take on the character of a velocity log and will have greatly enhanced value.

Thus, the objective of the present invention is to convert a field seismogram, such as seismic trace 24, into a velocity log.

If the reverse operation be considered for a moment, i.e., the conversion of step 29b on the velocity log 29 to the waveform 27, the underlying philosophy of the present invention will be more readily understood. For example, referring to FIG. 3a, if there be applied a pulse such as a step function 51, representative of variations in pressure following detonation of charge 11, to a filter 50 which represents the combined effects on the frequency and amplitude spectrum of the shot pulse of attenuation by the earth, detection by detector 13a, and the filtering in the recording system, there will be produced at the output a waveform 52. In general, the manner of constructing the filter 50 to convert a step function 51 at the input to the waveform 52 at the output is well understood by those skilled in the art.

Referring now to FIG. 3b, if the waveform 52 be now applied to an inverse filter 53 which transforms the waveform 52 back into the step 51, it will be seen that there will have been achieved means for transforming other waveforms, such as reflections represented by the waveforms 27 and 28, into steps representative of the interfaces 15 and 19 as they appear at 29b and 29d on the velocity log 29, FIG. 2. Having thus established the needed characteristics of the inverse filter, there may then be applied to the input of the inverse filter 53 signals corresponding with the variations of the trace 24 as a whole for the production of the entire velocity log.

There will now be considered the manner in which there is established the characteristics of an inverse filter to convert a particular waveform as it appears on the trace 24 to the corresponding step which would appear on a continuous velocity log.

The filtering characteristics of the earth and the instruments may be depicted as shown in FIG. 4a. This shows the amplitude response $B(f)$ of the earth and the instruments as a function of frequency $(f)$. In order to convert a seismogram back to a function directly representative of velocity layering, it is necessary to filter the seismogram with a filter having the inverse filter characteristics shown in FIG. 4b. Again, the amplitude response $A'(f)$ of the inverse filter is shown as a function of frequency.

In accordance with the present invention, inverse filtering with the frequency response shown in FIG. 4b is obtained with a filter having the frequency response of FIG. 4a by connecting that filter into the negative feedback loop of a high gain amplifier.

As shown in FIG. 5, the seismogram will have been recorded on any suitable reproducible record 55, such as a magnetic tape. The seismogram is converted to a voltage function representative of the seismogram by a pickup head 56. The output of the pickup head 56 is applied to an operational amplifier or adder 57, the output of which is applied to a high gain amplifier 58. A filter 59 is connected between the output of the amplifier 58 and the adder 57. The output of filter 59 is applied to the adder in the opposite sense from the input function, so that the output from filter 59 applies negative feedback to amplifier 58. The filter 59 has the frequency response characteristics of the earth and the instruments, such as the frequency response characteristics shown in FIG. 4a. These frequency response characteristics can be obtained quite easily from any good reflection waveform on the seismogram or can be obtained by other methods. Commonly, the filter characteristics of the earth and instruments can be estimated to a good approximation by an operator trained in the study of seismograms. Another technique of obtaining the proper filtering characteristics is to merely vary the characteristics of filter 59 until the proper output of the amplifying system is obtained. An operator will immediately perceive when the characteristics of filter 59 approximately represent the filtering of the earth and instruments by noting that reflections such as 27 and 28 are converted to steps at positions at which the operator expects velocity contrasts to occur.

With the filter 59 connected in the feedback loop of the amplifying system as shown in FIG. 5, the feedback amplifying system will perform filtering on the seismogram, which filtering is the inverse of the filtering action of the earth and the instruments. The output of the amplifier 58 is applied to a second filter 60. This filter is a band pass filter which eliminates the low frequency and high frequency noise which is generated when inverse filtering is performed in accordance with this invention. The filter 60 has characteristics such that the inverse filter characteristics of the amplifying system, as shown in FIG. 4b, are modified by the dotted lines indicated at 60a and 60b.

When the seismogram is inverse filtered in the manner described above, each reflection, such as 27 or 28 in FIG. 1, is converted to an impulse which impulse would have appeared on the seismogram in the absence of any filtering action by the earth and instruments. In order to convert these impulses to step functions, similar to the easily recognizable step functions 29b and 29d on the velocity log of FIG. 2, an integrator 61 is connected in the output circuit of amplifier 58. This integrator converts each impulse to a step function which is easily recognizable.

The output of integrator 61 is applied to any suitable recorder 62 which records the inverse filtered seismogram representative of the velocity layering of the earth. Such a record can be quite easily interpreted.

It will now be shown that the amplifying system shown in FIG. 5 does have the characteristics of an inverse filter. Those familiar with feedback theory will readily appreciate that the frequency response of the amplifying system shown in FIG. 5 is the inverse of the frequency response of the filter 59. However, this will be shown mathematically in the following analysis.

Assume that the amplifier 58 has a frequency response, or gain as a function of frequency, of $A(f)$ and the filter 59 has a frequency response, or gain as a function of frequency, of $B(f)$. Assume that the signal at the output of pickup head 56 is $E_s(f)$ and the input to amplifier 58 is a signal $E_s'(f)$. (In the following description, primed reference characters, such as $E_s'$, denote the inputs or outputs of the amplifying system with feedback; and unprimed reference characters denote the inputs or outputs without feedback.) The output of amplifier 58 is denoted $E_o'(f)$ which is equal to $A(f) E_s'(f)$. A portion of the output signal equal to $B(f) E_o'(f)$ is fed back through filter 59 to the input of amplifier 58.

The no-feedback gain $A(f)$ of the amplifier 58 is equal to the ratio of the voltage appearing across the output terminal and the voltage appearing across the input terminal or:

$$A(f) = \frac{E_o'(f)}{E_s'(f)}$$

Of more interest is the ratio of output voltage to total input voltage which we will define as the gain of the amplifier with feedback $A'(f)$. It can be seen that the total input voltage may be written:

$$E_s'(f) = E_s(f) - B(f) E_o'(f)$$

Therefore, the overall gain of the amplifier with feedback is:

$$A'(f) = \frac{E_o'(f)}{E_s(f)} = \frac{E_o'(f)}{E_s'(f) + B(f) E_o'(f)}$$

If both the numerator and denominator of the above equation are divided by $E_s'(f)$ and $$\frac{E_o'(f)}{E_s'(f)}$$

is replaced by $A(f)$, the result is:

$$A'(f) = \frac{A(f)}{1 + A(f) B(f)}$$

Since we have assumed that the amplifier 58 is a high gain amplifier, it can be seen that the quantity $A(f) B(f)$ is very much greater than 1. Therefore, to a close approximation, the 1 in the denominator of the above equation can be ignored and it can be seen that:

$$A'(f) = \frac{1}{B(f)}$$

In this manner, it is shown that the frequency response or gain as a function of frequency, of the amplifier system, $A'(f)$, is the inverse of the frequency response of the filter 59, $B(f)$. Therefore, it is possible to perform inverse filtering by connecting a filter having the filter characteristics of the earth and seismic instruments in the feedback loop of a high gain amplifier. This avoids the previously difficult task of setting up a filter having the inverse filter characteristics of the earth.

Referring now to FIG. 6, there is shown in more detail the circuitry for inverse filtering seismograms in accordance with this invention. As shown in FIG. 6, the filter 59 of FIG. 5 takes the form of a time domain filter. However, it will be understood that it is possible to use any other suitable filtering device.

The seismogram is commonly recorded on magnetic tape 63 which is driven beneath pickup head 64. The output of pickup head 64 is applied through amplifier 67 to an electronic delay line 68, the tapped outputs of which are applied to an adder or summing circuit which includes the resistors 65 and 66. Resistors 65 and 66 are connected to the input to the high gain amplifier 67, the output of which is recorded as well as being applied to the electronic delay line 68. The electronic delay line 68 is the principal component in a time domain filter which correpsonds with the feedback filter 59 in FIG. 5. In its preferred form the delay device is an electronic delay line having cascaded delay increments of approximately 1 millisecond each. However, it will be understood that other delay devices including a very high-speed magnetic drum may be used.

A series of taps, the five taps 69–73 being shown, are spaced along the delay line 68 by predetermined increments of delay. Each tap of the delay line is connected to a summing circuit 74 which includes resistors 75–79 and amplifier 80. The circuit from tap 73 to the summing circuit 74 includes a reversing switch 81 and an amplifier 82, the output of which is applied to a potentiometer 83 for selection of a desired proportion of the signal developed at the output of the amplifier 82. The components of the corresponding circuits have corresponding reference characters with different identifying letters added for each circuit, it being understood that amplifiers 82b–82n each include a potentiometer corresponding to potentiometer 83. The letter $n$ for the circuit from tap 69 is indicative of the fact that any required number of circuits may be employed.

The spacing of the taps, the positions of the reversing switches, the setting of the output potentiometers and the characteristics of a delay line with tapped outputs are matters generally within the knowledge of those familiar with time domain filtering. The foregoing parameters are adjusted in accordance with the desired impulse response of the required filter. In the present case, the impulse response is represented by the filtering characteristics of the earth and the seismic instruments.

One method of obtaining the impulse response is to use a good reflection from a known reflecting interface. The waveform shown in FIG. 7 represents such a good reflection. The reflection may be, for example, the reflection 27 on the seismogram of FIG. 1 if the operator knows that this represents a good reflection from the interface 15. This waveform is representative of the response of the earth and the seismic instruments to a reflection impulse. As shown in FIG. 7, samples have been taken at the peaks and troughs of each leg in the waveform. The spacing between samples in FIG. 7 is satisfactory if that spacing is less than half the duration of the shortest pulse in the desired output signal. Where the shortest output pulse if of short duration, more taps will be used and the samples will be taken at closer intervals, all equally time-spaced one from the other.

In FIG. 6 the potentiometer 83 is set to correspond with the amplitude $k_1$, FIG. 7, at the first sampling point. The tap 70 is time-spaced from the tap 69 by a time interval $d_1$ equal to the time-spacing between $k_1$ and $k_2$. Similarly, the potentiometers of amplifiers 82b–82n are set in accordance with the amplitudes $k_2$ to $k_5$ at the sampling points, and the taps 70–73 are spaced apart by the corresponding amounts $d_2$, $d_3$ and $d_4$.

In the foregoing manner the time domain filter is quite easily adjusted to represent the filtering characteristics of the earth and the seismic instruments. The outputs of the amplifiers 82–82n are summed in the summing circuit 74, the output of which is applied to an amplifier 80. This amplifier 80 also inverts the phase of the output of the time domain filter so that the feedback signal is applied to resistor 66 in the opposite phase with respect to the seismogram function applied to resistor 65.

As has been previously shown, when the feedback filter is set to the filter characteristics of the earth, shown in the frequency domain in FIG. 4a and in the time domain in FIG. 7, then the output of the amplifier 67 represents the seismogram function filtered by the inverse of the characteristics of the earth and instruments.

The output of amplifier 67 is applied to the band pass filter 84. This filter corresponds with the filter 60 shown in block form in FIG. 5. The filter 84 performs the function of cutting out the high and low frequency noise which is generated by the inverse filter operation. One filter suitable for use as the filter 84 is a Khron-Hite variable band pass filter. This filter has a high-pass section which is adjustable to pass all frequencies above a cutoff frequency which may be varied from .02 cycle per second to 20 cycles per second. The low-pass section can be adjusted to pass all frequencies below a cutoff frequency which is variable from 20 cycles per second to 2000 cycles per second. Thus, a band limit of from 0.5 cycle per second to 250 cycles per second, for example, is readily obtained for the filter 84.

The output of filter 84 is applied to integrator 85 which corresponds with the integrator 61 shown in block form in FIG. 5. As shown in FIG. 6, the integrator 85 may commonly include the input resistor 86, a high gain D.C. amplifier 87 and a capacitor 88 connected in the feedback circuit of the high gain D.C. amplifier.

The output of integrator 85 is applied to a recording device 89 which positions a pen on the moving strip 90 to produce a log which is similar to the velocity log shown in FIG. 2 and which is equally easy to interpret.

In this manner, a seismogram has been converted to a form analogous to a velocity log by a method which obviates the difficulty of setting up a filter having the inverse of the filter characteristics of the earth and the seismic instruments.

While a particular embodiment of the invention has been shown and described, it will, of course, be understood that various modifications may be made without departing from the true spirit and scope of the invention. The appended claims, therefore, are intended to cover any such modifications.

What is claimed is:

1. A system for inverse filtering a seismogram to convert it to a function representative of the velocity layering of the earth comprising
   means for converting said seismogram to a time varying voltage,
   an amplifier,
   a summing circuit connected between said means for converting said seismogram and the input to said amplifier,
   a filter having frequency response characteristics which are the same as the frequency response of the earth and the instruments used in obtaining said seismogram,
   said filter being connected between the output of said amplifier and said summing circuit, the output of said filter being applied to said summing circuit with a polarity producing negative feedback in said amplifier.

2. The system recited in claim 1 further including a band pass filter, the output of said amplifier being applied to the input of said band pass filter, said band pass filter blocking noise passed by the inverse filtering performed by the amplifier and the feedback filter, and
   further including an integrator connected to the output of said band pass filter, said integrator converting impulses resulting from said inverse filtering operation into step functions whereby the output of said integrator is a voltage representative of the velocity layering of the earth and including step functions corresponding with changes in the velocity layering of the earth, and
   further including means for recording signals from the output of said integrator against a time base related to that of said seismogram.

3. The system recited in claim 1 wherein said filter having frequency response characteristics which are the same as the frequency response of the earth is a time domain filter including means for varying the characteristics of said time domain filter so that said characteristics correspond with those of a reflection waveform produced by a known reflecting surface in the earth's layering.

4. The system recited in claim 3 wherein said time domain filter includes a tapped delay line,
   means for impressing the output of said high gain amplifier on said delay line,
   a plurality of taps spaced along said delay line,
   means controlling the time spacing between said taps in accordance with the spacing between a plurality of sampling points on a waveform produced by a reflection from a known reflecting surface of the earth's layering, and
   means connected to the output of each of said taps for varying the amplitude of the reproduced signals in accordance with the amplitude of said waveform at said sampling points, the output of said last-named means being applied to said summing circuit with a polarity producing negative feedback in said amplifier.

5. The method of inverse filtering a seismogram to convert it to a function representative of the velocity layering of the earth comprising:
   converting said seismogram to a time varying electrical signal,
   summing said time varying electrical signal with a feedback signal to produce an output signal,
   feedback filtering said output signal with a filter having frequency response characteristics which are the same as the frequency response of the earth and the instruments used in obtaining said seismogram to produce said feedback signal, and
   band pass filtering said output signal to block noise passed by the feedback filtering step to produce a band limited signal.

6. The method of claim 5 further including:
   integrating said band limited signal to convert impulses resulting from said feedback filtering into step functions whereby there is produced a signal representative of the velocity layering of the earth and including step functions corresponding with changes in the velocity layering of the earth.

7. The method recited in claim 6 further including:
   recording said signal representative of the velocity layering of the earth against a time base related to that of said seismogram.

8. The method of inverse filtering a seismogram to convert it to a function representative of the velocity layering of the earth comprising:
   converting said seismogram to a time varying signal,
   summing said time varying signal with a feedback signal to produce an output signal,
   feedback filtering said output signal with a filter having frequency response characteristics which are the same as the frequency response of the earth and the instruments used in obtaining said seismogram to produce said feedback signal,
   band pass filtering said output signal to block noise passed by the feedback filtering step to produce a band limited signal,
   integrating said band limited signal to convert impulses resulting from said feedback filtering into step functions whereby there is produced a signal respresentative of the velocity layering of the earth and including step functions corresponding with changes in the velocity layering of the earth, and
   recording said signal representative of the velocity layering of the earth against a time base related to that of said seismogram.

9. A system for inverse filtering a seismogram to convert it to a function representative of the velocity layering of the earth comprising:
   means for converting said seismogram to a time varying signal, an amplifier, a summing circuit connected between said means for converting said seismogram and the input to said amplifier, a filter having frequency response characteristics which are the same as the frequency response of the earth and the instruments used in obtaining said seismogram, said filter being connected between the output of said amplifier and said summing circuit, the output of said filter being applied to said summing circuit with a polarity producing negative feedback in said amplifier, said filter being a time domain filter including means for varying the characteristics of said time domain filter so that said characteristics correspond with those of a reflection waveform produced by a known reflecting surface in the earth's layering, a band pass filter, the output of said amplifier being applied to the input of said band pass filter, said band pass filter blocking noise passed by the inverse filtering performed by the amplifier and the feedback filter, an integrator connected to the output of said band pass filter, said integrator converting impulses resulting from said inverse filtering operation into step functions whereby the output of said integrator is a voltage representative of the velocity layering of the earth and including step functions corresponding with changes in the velocity layering of the earth, and means for recording signals from the output of said integrator against a time base related to that of said seismogram.

References Cited by the Examiner
UNITED STATES PATENTS

| | | | |
|---|---|---|---|
| 3,045,207 | 7/1962 | Peterson | 340—15.5 |
| 3,070,777 | 12/1962 | Lindsey et al. | 340—15.5 |
| 3,076,177 | 1/1963 | Lawrence et al. | 340—3 |
| 3,174,032 | 3/1965 | White | 235—181 |

SAMUEL FEINBERG, *Primary Examiner.*

BENJAMIN A. BORCHELT, *Examiner.*

R. M. SKOLNIK, *Assistant Examiner.*